United States Patent [19]

Lacroix

[11] 4,260,391
[45] Apr. 7, 1981

[54] STABLE CONCENTRATED SOLUTION OF A DYE OF THE DISAZO CLASS

[75] Inventor: Roger Lacroix, Huningue, France

[73] Assignee: Ciba-Geigy Corporation, Ardsley, N.Y.

[21] Appl. No.: 16,682

[22] Filed: Mar. 1, 1979

[30] Foreign Application Priority Data

Jan. 18, 1979 [CH] Switzerland .................. 487790/79

[51] Int. Cl.³ .................... D06P 67/00; D06P 3/60
[52] U.S. Cl. ........................................ 8/519; 8/527;
  8/564; 8/609; 8/673; 8/687; 8/696; 8/919;
  8/937
[58] Field of Search .................. 8/41 R, 7, 85 B, 93,
  8/519, 527, 564, 919, 937

[56] References Cited

U.S. PATENT DOCUMENTS

| | | | |
|---|---|---|---|
| 3,621,008 | 11/1971 | Ross et al. | 8/681 |
| 3,852,029 | 12/1974 | Bolliger et al. | 8/527 |
| 3,963,430 | 6/1976 | Nonn et al. | 8/41 R |
| 3,986,827 | 10/1976 | Dombchik | 8/41 R |
| 4,073,615 | 2/1978 | Lacroix et al. | 8/41 R |
| 4,074,966 | 2/1978 | Lacroix et al. | 8/41 R |
| 4,098,569 | 7/1978 | Lacroix et al. | 8/41 R |

FOREIGN PATENT DOCUMENTS 2822318 12/1978 Fed. Rep. of Germany .
1453046 10/1976 United Kingdom .
1457412 12/1976 United Kingdom .

Primary Examiner—A. Lionel Clingman
Attorney, Agent, or Firm—Edward McC. Roberts

[57] ABSTRACT

There is described a stable concentrated solution of a dye of the disazo class, which solution contains 15 to 30 percent by weight of the dye of the formula

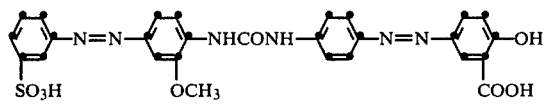

in the form of the lithium salt, optionally in admixture with up to 75 percent by weight of the sodium, potassium or ammonium salt, dissolved in 5 to 35 percent by weight of water, 2 to 10 percent by weight of pyrrolidone or of N-alkyl-($C_1$-$C_4$)-pyrrolidone and 35 to 50 percent by weight of a diethylene glycol monoalkyl ether; a process for producing this liquid preparation, and its use for dyeing and printing cellulose and regenerated cellulose, particularly however for dyeing paper.

8 Claims, No Drawings

STABLE CONCENTRATED SOLUTION OF A DYE OF THE DISAZO CLASS

The invention relates to a stable concentrated solution of a dye of the disazo class, to a process for producing it, and to its use for dyeing cellulose and regenerated cellulose and, in particular, paper.

Liquid preparations of acid disazoarylurea dyes, inter alia also of paper dyes, are known e.g. from the German Offenlegungschrift No. 2,629,674, equivalent to U.S. Pat No. 4,098,569. These preparations are characterised by the fact that they contain the dye, optionally in the form of an alkali metal salt, particularly of the sodium salt, dissolved in a diethylene glycol monoalkyl ether, optionally in admixture with an alkylene glycol. It has however been shown that difficulties can occur in production in the works, for example the filtering of the solution is problematic, and furthermore these solutions contain an undesirably high proportion of organic solvent.

In addition, dye preparations of azo or nitro dyes containing sulfonic acid groups, inter alia also of paper dyes, are known from German Offenlegungsschrift No. 2,335,512, equivalent to British Pat. No. 1,453,046. These contain the dye dissolved in a solvent mixture which is miscible with water in any proportion and which consists of an aprotic solvent or a mixture of aprotic solvents, a glycol or glycol ether and optionally water.

It is however not possible to produce stable concentrated solutions of the dye of the formula

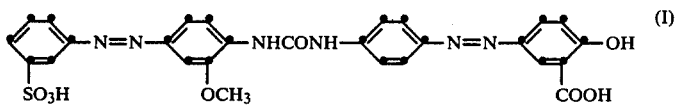

in the form of the sodium, potassium or ammonium salt according to German Offenlegungsschrift No. 2,335,512.

Form the German Offenlegungsschrift No. 2,343,588, equivalent to U.S. Pat. No. 3,986,827, a liquid preparation of monosulfonated disazo dyestuffs is known for the dyeing of polyamide textile materials. Besides the dyestuff in the form of the lithium or tri-(2-hydroxyethyl)-ammonium salt, this preparation contains N-methylpyrrolidone and water. It is, however, not possible with this preparation to obtain a concentrated solution suitable for application to paper in soft water with the dyestuff of the formula I in the form of the lithium or tri-(2-hydroxyethyl)-ammonium salt.

It has now been found that, surprisingly, stable concentrated true solutions which do not have the disadvantages mentioned above are obtained by dissolving the lithium salt of the dye of the formula I in a mixture of water, pyrrolidone or N-alkylpyrrolidone and diethylene glycol monoalkyl ether. The solution can additionally contain up to 75% relative to the total weight of the dye, of the sodium, potassium or ammonium salt of this dye.

The dye solution according to the invention contains 15 to 30, preferably 20 to 25, percent by weight of the lithium salt of the dye of the formula I dissolved in 5 to 35, preferably 20 to 30, percent by weight of water, 2 to 10, preferably 3 to 8, percent by weight of pyrrolidone or of N-alkyl($C_{1-C4}$)pyrrolidone and 35 to 50, preferably 40 to 50, percent by weight of a diethylene glycol monoalkyl ether. N-Alkylpyrrolidone is for example N-ethyl- or preferably N-methylpyrrolidone, and diethylene glycol monoalkyl ether is preferably diethylene glycol monoethyl ether.

This novel liquid preparation has a high concentration of dye, is thinly-liquid, has a viscosity of about 55 cP/20° C., is stable in storage over several months at temperatures between about −10° C. and +60° C., is soluble in cold water and warm water in any proportion, and may be considered toxicologically safe.

This dye solution is produced for example by adding, while vigorously stirring, the disazo dye as defined, in the form of the free acid, for example as dry material, to a mixture of N-methylpyrrolidone, diethylene glycol monoethyl ether and water; neutralising with lithium hydroxide, optionally in admixture with up to 75 percent by weight of sodium hydroxide, potassium hydroxide or ammonium hydroxide; and further stirring until a true solution is obtained, and optionally filtering this solution.

The dye acid can also be used as aqueous press cake, if it is ensured that the desired water content of the finished solution is not exceeded. This can be achieved for example by freeing the press cake from excess water by a thorough pressing out, or an amount of dye can be added as dry powder in order to obtain the desired content of water.

To obtain the free dye acid, the dye salt, for example in the form of the dry crude dye salt, is made into a suspension, and this is adjusted with a strong acid to a pH value of 1-2, filtered and optionally dried.

The liquid preparation according to the invention, optionally after dilution with water, is used particularly for dyeing and printing cellulose and regenerated cellulose, especially cellophane, paper, semi-cardboard and cardboard; and the paper materials can be dyed for example in the pulp or by immersion.

Furthermore, a liquid preparation of this type can also be used in a continuous or discontinuous dyeing process for textile materials made from cellulose.

The following Examples illustrate the invention. The temperature values are given in degrees Centigrade; "SR" denotes "Schopper Riegler" and "atro" signifies "absolutely dry"; and, except where otherwise stated, % values are given as percent by weight, and 'parts' are parts by weight.

EXAMPLE 1

(1) Preparation of the solution (a) 275 parts of delimed water, 45 parts of N-methylpyrrolidone and 450 parts of diethylene glycol monoethyl ether are mixed together.

220 parts of the dye of the formula

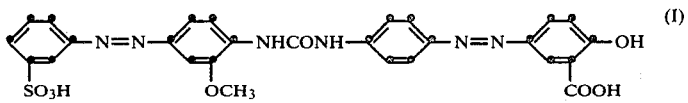

as free acid are stirred in the form of a dry ground powder into the solvent mixture with vigorous stirring. There is immediately added lithium hydroxide monohydrate (LiOH/H$_2$O), and stirring is continued for a further 5 hours. The pH value of the mixture is held at 7 to 8. To effect complete solution and to adjust the end pH value to 7 to 8, about 10 parts of lithium hydroxide monohydrate are required. The solution is filtered through a metal sieve of 25 μm mesh in order to separate any undissolved salts and other solids (impurities from metal, quartz, silica, and so forth) which are present.

There is obtained a dye solution consisting of about 22 percent by weight of the above dye as lithium salt, 1 percent by weight of mineral salt (KCl, NaCl, LiCl), 27.5 percent by weight of water, 4.5 percent by weight of N-methylpyrrolidone and 45 percent by weight of diethylene glycol monoethyl ether. The solution has a viscosity of 55 cP/20° and, after dilution with water, is used in particular for dyeing paper. The solution remains stable even after storage over several months at temperatures between −10° and +60°.

(b) The dry dye powder in the above Example can be replaced by the acid press cake, provided it is ensured that the press cake does not contain more than about 300 parts of water. If the press cake contains too much water, the excess water can be reduced by better pressing out or by the addition of dry dye.

(c) The desired colouring strength of the final solution can be adjusted, depending on circumstances, by the addition of diethylene glycol monoethyl ether or of a mixture of diethylene glycol monoethyl ether and water.

(2) Preparation of the free dye acid

From the solution obtained from synthesis containing the sodium salt of the dye of the formula I, the salt is salted out at 95° by the addition of potassium chloride in such an amount that the solution contains 4% of potassium chloride.

The mixture is allowed to cool to 20°, and is then further cooled to 0° by the addition of ice. The dye is converted into the free acid by the addition of hydrochloric acid at 0° to 5°, especially at 0° to 1°. The dye acid which has precipitated is filtered off, and washed with a mixture of 1% sodium chloride solution and 0.5% hydrochloric acid at 5°, and then dried.

EXAMPLE 2

260 parts of delimed water, 50parts of 2-pyrrolidone and 440 parts of diethylene glycol monoethyl ether are mixed together. 220 parts of the dyestuff of the formula I given in Example 1 as free acid are stirred in the form of a dry ground powder into the solvent mixture with vigorous stirring. There is immediately added lithium hydroxide monohydrate, and stirring is continued for a further 5 hours. The pH value of the mixture is held at 7 to 8. To effect complete solution and to adjust the end pH value to 7 to 8, about 30 parts of lithiumhydroxide monohydrate are required. The solution is filtered through a metal sieve of 25 μm mesh in order to separate any undissolved salts and other solids which are present.

A dye solution is obtained, consisting of about 24 percent by weight of the above dye as lithium salt, about 1 percent by weight of mineral salt (KCl, NaCl, LiCl), 26 percent by weight of water, 5 percent by weight of 2-pyrrolidone and 44 percent by weight of diethylene glycol monoethyl ether. The solution has a viscosity of about 55 cP/20° and, after dilution with water, is used in particular for dyeing paper. The solution remains stable even after storage over several months at temperatures between −10° and +60°.

EXAMPLE 3

260 parts of delimed water, 50 parts of N-methylpyrrolidone and 440 parts of diethylene glycol monoethyl ether are mixed together. 220 parts of the dyestuff of the formula I given in Example 1 as free acid are stirred in the form of a dry ground powder into the solvent mixture with vigorous stirring. There is immediately added 15 parts of lithium hydroxide monohydrate and 15 parts of sodium hydroxide in the form of platelets, and stirring is continued for a further 5 hours.

A dye solution is obtained, consisting of about 24 percent by weight of the above dye as a ca. 1:1 mixture of the lithium and sodium salts, about 1 percent by weight of mineral salt, 26 percent by weight of water, 5 percent by weight of N-methylpyrrolidone and 44 percent by weight of diethylene glycol monoethyl ether. This solution is stable at temperatures between −10° and +60°.

EXAMPLE 4

If the sodium hydroxide in Example 3 is replaced by an equal amount of potassium hydroxide (platelets) and otherwise the procedure is followed exactly, a corresponding dye solution is obtained, containing about 24 percent by weight of the above dye as a ca. 1:1 mixture of the lithium and potassium salts and having similar good properties.

EXAMPLE 5

Printing paper 800 kg of bleached sulfate pulp and 200 kg of bleached sulfite pulp in the form as supplied are placed into a pulper containing 14 m$^3$ of industrial water, and are beaten up until free from specks. The beating operation requires 30 minutes. The beaten pulp is subsequently transferred to a discharge vat. From the discharge vat the pulp suspension is ground with pulp grinders to a fineness of 25° SR, and is subsequently fed into a mixing vat. In the mixing vat are then added as further additives 250 kg of kaolin Ia (as filler) and 0.05 to 0.1% of the dye preparation according to Example 1, calculated relative to "atro" fibre. After an absorption time of 15 minutes, there are added 2% of resin glue, calculated relative to "atro" cellulose and, after 10 minutes, 4% of alum, calculated relative to "atro" cellulose. In the normal course of the process, this paper pulp is then fed to the paper machine. A printing paper dyed in a yellow shade is obtained.

EXAMPLE 6

Tissue paper 1000 kg of bleached sulfite pulp in the form as supplied is placed into a pulper containing 14 m³ of industrial water, and is beaten up until free from specks. The beating operation requires 30 minutes. The beaten pulp is subsequently transferred to a discharge vat, and from this vat the pulp is ground with pulp grinders to obtain a degree of fineness of 25° SR, and is then fed into a mixing vat, in which is added 0.05 to 0.1% of the dye preparation according to Example 1, relative to "atro" fibre. After an absorption time of 15 minutes, this paper pulp is then fed in the normal course of the process to the paper machine. A tissue paper dyed in a yellow shade is obtained.

EXAMPLE 7

Sizing press application 5 kg of dye in the form of a solvent-containing preparation according to Example 1 is dissolved in 1000 liters of a 10% aqueous anionic starch solution (soluble starch which is oxidatively hydrolysed), and the solution is applied via a sizing press to a paper web. The amount of the above solution applied is 1.5 g/m² "atro" per side. A paper dyed in a yellow shade is obtained.

What is claimed is:

1. A stable concentrated solution of 15 to 30 percent by weight of the dye of the formula

in the form of the lithium salt, dissolved in 5 to 35 percent by weight of water, 2 to 10 percent by weight of pyrrolidone or of N-alkyl-($C_1$-$C_4$)-pyrrolidone and 35 to 50 percent by weight of a diethylene glycol monoalkyl ether.

2. A stable concentrated solution according to claim 1, which additionally contains up to 75 percent by weight, relative to the total weight of the dye, of the sodium, potassium or ammonium salt of this dye.

3. A stable concentrated solution according to claim 1, which contains 20 to 25 percent by weight of the disazo dye according to claim 1, dissolved in 20 to 30 percent by weight of water, 3 to 8 percent by weight of pyrrolidone or of N-alkyl-($C_1$-$C_4$)-pyrrolidone and 40 to 50 percent by weight of a diethylene glycol monoalkyl ether.

4. A stable concentrated solution according to claim 1, which contains, as diethylene glycol monoalkyl ether, diethylene glycol monoethyl ether.

5. A stable concentrated solution according to claim 1, which contains N-methylpyrrolidone.

6. A process for producing the solution according to claim 1 or 2, which process comprises adding, while vigorously stirring, the disazo dye as defined, in the form of the free acid, either as dry material or as aqueous press cake, to a mixture of pyrrolidone or N-alkylpyrrolidone, diethylene glycol monoalkyl ether and optionally water; neutralising with lithium hydroxide, optionally in admixture with up to about 75 percent by weight of sodium hydroxide, potassium hydroxide or ammonium hydroxide; and further stirring until a true solution is obtained, and optionally filtering this solution.

7. The material made from cellulose and regenerated cellulose, particularly cellophane, paper, semi-cardboard and cardboard, dyed or printed with the solution according to claim 1.

8. A method of coloring cellulose or regenerated cellulose comprising the steps of applying thereto a stable solution of 15 to 30% by weight of the dye of the formula

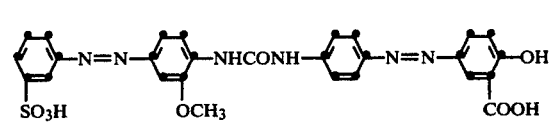

in the form of the lithium salt, dissolved in 5 to 35 percent weight of water, 2 to 10 percent by weight of pyrrolidone or N-alkyl-($C_1$-$C_4$)-pyrrolidone and 35 to 50 percent by weight of a diethylene glycol monoalkyl ether.

* * * * *